United States Patent
Romaszewicz et al.

(10) Patent No.: US 11,610,375 B2
(45) Date of Patent: *Mar. 21, 2023

(54) MODULATED DISPLAY AR TRACKING SYSTEMS AND METHODS

(71) Applicant: MSG Entertainment Group, LLC, New York, NY (US)

(72) Inventors: Michael Romaszewicz, Brooklyn, NY (US); Andrew Plourde, New York, NY (US)

(73) Assignee: MSG Entertainment Group, LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/492,392

(22) Filed: Oct. 1, 2021

(65) Prior Publication Data

US 2022/0020222 A1 Jan. 20, 2022

Related U.S. Application Data

(63) Continuation of application No. 16/679,005, filed on Nov. 8, 2019, now Pat. No. 11,176,746.

(51) Int. Cl.
*G06T 19/00* (2011.01)
*G02B 27/01* (2006.01)
*G06K 19/06* (2006.01)
*G06V 20/20* (2022.01)

(52) U.S. Cl.
CPC ........ *G06T 19/006* (2013.01); *G02B 27/0101* (2013.01); *G06K 19/06037* (2013.01); *G06V 20/20* (2022.01); *G02B 2027/014* (2013.01)

(58) Field of Classification Search
CPC .............. G06T 19/006; G02B 27/0101; G02B 2027/014; G06K 9/00671; G06K 19/06037

See application file for complete search history.

(56) References Cited

U.S. PATENT DOCUMENTS

| | | | |
|---|---|---|---|
| 8,813,154 B1* | 8/2014 | Sivertsen | H04N 21/8146 235/462.07 |
| 9,471,824 B2* | 10/2016 | Finlow-Bates | H04N 21/8586 |
| 10,318,811 B1* | 6/2019 | Gold | G06T 19/006 |

(Continued)

OTHER PUBLICATIONS

International Search Report and Written Opinion, for PCT App. No. PCT/US2020/059391, filed Nov. 6, 2020, 11 pages, dated Dec. 17, 2020.

*Primary Examiner* — Abderrahim Merouan
(74) *Attorney, Agent, or Firm* — Sterne, Kessler, Goldstein & Fox P.L.L.C.

(57) ABSTRACT

Modulated display AR tracking systems and methods include a display configured to transmit first image content, the image content comprising a first image content frame and a second image content frame and a device comprising an image sensor, a processor and a memory. The device identifies the first image content frame and the second image content frame by distinguishing at least one feature of the first image content frame. The device recognizes at least one tracking pattern embedded of the second image content frame and retrieves a graphical element based on the at least one tracking pattern of the second image content frame. The device displays augmented image content including the first image content frame and the graphical element.

20 Claims, 9 Drawing Sheets

(56) References Cited

U.S. PATENT DOCUMENTS

| | | | |
|---|---|---|---|
| 2001/0012072 A1* | 8/2001 | Ueno | H04N 5/232935 348/240.99 |
| 2004/0227829 A1* | 11/2004 | Wixson | H04N 5/335 348/E3.018 |
| 2008/0089552 A1* | 4/2008 | Nakamura | H04N 21/835 375/E7.009 |
| 2013/0237811 A1* | 9/2013 | Mihailescu | G01S 17/894 600/407 |
| 2014/0253591 A1 | 9/2014 | Hayakawa et al. | |
| 2014/0316543 A1 | 10/2014 | Sharma et al. | |
| 2015/0014417 A1* | 1/2015 | Finlow-Bates | H04N 21/6581 235/494 |
| 2015/0062163 A1* | 3/2015 | Lee | G06T 19/006 345/633 |
| 2016/0247423 A1* | 8/2016 | Hohl | H04N 21/812 |
| 2017/0031502 A1* | 2/2017 | Rosenberg | G06F 3/04883 |
| 2017/0221272 A1* | 8/2017 | Li | G06T 7/248 |
| 2018/0300551 A1* | 10/2018 | Luccin | G06V 20/20 |
| 2019/0259124 A1* | 8/2019 | Barnett | H04N 19/40 |
| 2021/0142569 A1 | 5/2021 | Romaszewicz et al. | |

\* cited by examiner

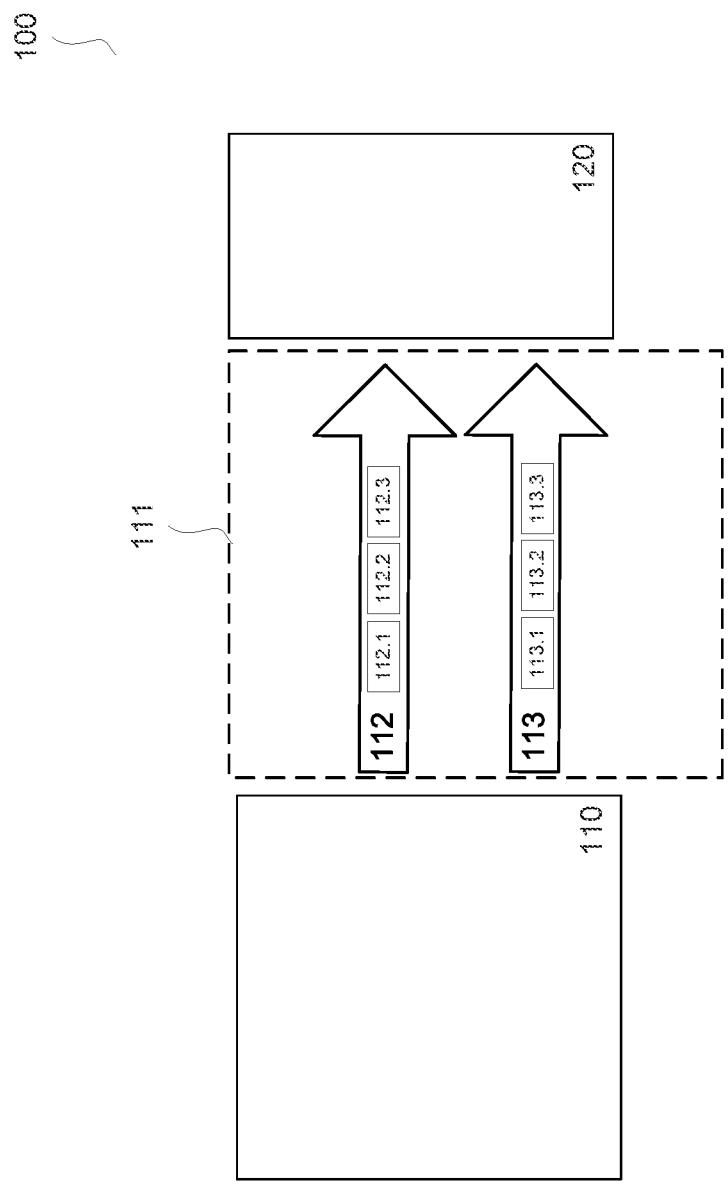

MODULATED DISPLAY AR TRACKING SYSTEMS AND METHODS

CROSS REFERENCE TO RELATED APPLICATIONS

This application claims is a continuation of U.S. patent application Ser. No. 16/679,005, filed on Nov. 8, 2019, now U.S. Pat. No. 11,176,746, which is incorporated herein by reference in its entirety.

BACKGROUND

Tracking codes, such as QR codes or NFC tags, can be received by an image sensor to cause a processor to perform a given operation. For example, a mobile device may detect a tracking code and cause a web browser on the mobile device to open a hyperlink. However, conventional tracking codes take the form of a visible code perceptible to the human eye.

In three dimensional content display (e.g., 3D movies with active glasses), to present a separate image to the left and right eyes, a shutter in the active glasses switches at a high frequency between the two eyes. The content displayed on the active glasses is based on content emitted by the screen alternatively including left eye and right eye content.

FIELD OF THE DISCLOSURE

This application relates generally to displaying content based on embedded tracking codes emitted by one or more devices and more specifically but not limited to displaying interactive content based on embedded tracking codes emitted within an entertainment venue.

BRIEF SUMMARY OF THE INVENTION

Embodiments described herein include systems and methods of establishing AR tracking in a controlled environment simultaneously with image content, including video content. Embodiments can include image content displayed at a high refresh rate, for example, on an LED screen with high speed cameras to present both a static tracking pattern that is not visible to the human eye and any arbitrary content that is visible to the human eye. More specifically, embodiments described herein include systems and methods for identifying a tracking pattern associated with a graphical element for an augmented reality display, or image recognition in general.

In some embodiments, a modulated display AR tracking system includes a display that emits first image content and second image content, where the second image content includes a tracking pattern to be received by an image sensor. First image content can be viewed by a user. Second image content can include the tracking pattern to be received by the user's device in an alternative set of frames from the first image content. Embodiments can minimize the amount of time that the static tracking pattern is emitted to avoid perception of the tracking pattern by the human eye.

BRIEF DESCRIPTION OF THE DRAWINGS/FIGURES

FIG. 1 is a schematic of a modulated display AR tracking system, according to some embodiments.

DETAILED DESCRIPTION OF THE INVENTION

Modulated Display AR Tracking System

Figure 2A:
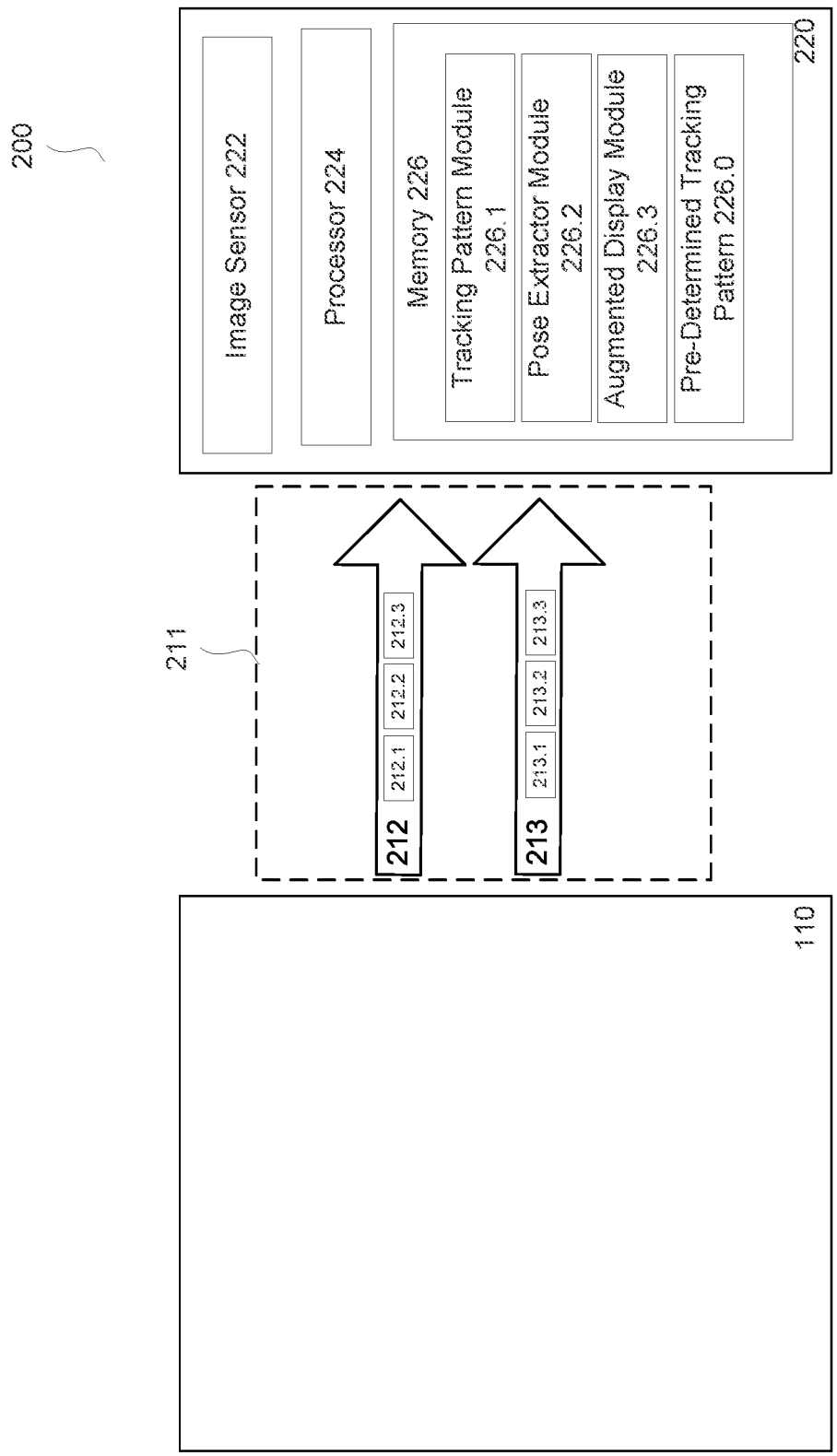
FIGS. 2A and 2B are schematics of a modulated display AR tracking system, according to some embodiments.

FIG. 1 illustrates a modulated display AR tracking system according to some embodiments. Referring to FIG. 1, modulated display AR tracking system 100 includes display 110 and device 120. The modulated display AR tracking system 100 is provided to render image content for a user that includes primary image content and augmented image (i.e., augmented reality or AR) content. The augmented image content can be based on a tracking code that is embedded within the primary image content. In some embodiments, the tracking code can be embedded within the primary image content at a frame rate not perceptible to the human eye.

Display 110 is configured to emit image content 111 to users, for example, image content to an audience. In some embodiments, display 110 can be for example, a Liquid Crystal Display (LCD), a Light-Emitting Diode (LED) display, an Organic Light-Emitting Diode (OLED) display, a projector-based display, an electronic paper display, or the like. In some embodiments, display 110 can include more than one display device.

Device 120 can be configured to receive image content 111 from display 110 and discern a first image content 112 and a second image content 113. First image content includes a population of first image content frames (e.g., frames 112.1 to 112.3) and second image content includes a population of second image content frames (e.g., frames 113.1 to 113.3).

In a non-limiting example, device 120 can include an image sensor, such as a camera configured to recognize second image content 113 within image content 111. In another example, device 120 can be a mobile device that includes an image sensor as described above and a display. In some embodiments, device 120 can be configured to receive frames at a sufficient frame rate to permit second image content 113 to be embedded and not perceptible to the human eye.

In some embodiments, device 120 can be configured to recognize a tracking code within the second image content frames 113.1 to 113.3. Based on the tracking code, device 120 augments the first image content (e.g., image content frames 112.1. to 112.3) to include modified or additional graphical elements.

Modulated Display AR Tracking System Including Pose Extractor

FIG. 2A illustrates a modulated display AR tracking system according to some embodiments. Elements in FIG. 2A with the same annotations as elements in FIG. 1 are described above. Referring to FIG. 2A, modulated display AR tracking system 200 includes display 110 and device

220. As above, modulated display AR tracking system 200 provides image content to a user that can include image content based on an embedded tracking code.

Device 220, which can be an embodiment of device 120 above, can be configured to receive image content 211 from display 110 and discern first image content 212 and second image content 213. First image content includes a population of first image content frames (e.g., frames 212.1 to 212.3) and second image content includes a population of second image content frames (e.g., frames 213.1 to 213.3).

Device 220 includes an image sensor 222, processor 224 and memory 226. In a non-limiting example, device 220 can be a mobile device operated by a user.

Image sensor 222 can be a camera or other photodetector device that captures still or video digital images. In some embodiments, image sensor 222 can be an image sensor, or plurality thereof, that includes a pixel array, such as a charged coupled device (CCD), or a complementary metal-oxide-semiconductor (CMOS) sensor, or the like. An example of an image sensor is the Stacked CMOS Image Sensor available from Sony of Sony City, Japan or the MT9V023 available from ON Semiconductor of Phoenix, Ariz. In some embodiments, image sensor 222 is part of a system-on-chip (SOC) with image sensing capabilities. The SOC may include a memory and/or an image signal processor (ISP) or other components. An example for such an SOC is the OV5640 available from OmniVision Technologies Inc. of Santa Clara, Calif. In some embodiments, image sensor 503 includes one or more optical lenses.

Processor 224 is adapted to run instructions stored in memory 226. Processor 224 may be a micro-controller unit (MCU), a digital signal processor (DSP) and/or an Image/Video Processing unit or like components that run instructions. An example of an MCU is a ST33G1M2 32 bit MCU with ARM SecurCore SC300 from ST Microelectronics of Geneva, Switzerland, or a MSP432P401x available from Texas Instruments Inc. of Dallas, Tex. An example of a DSP is C5000 available from Texas Instruments Inc. of Dallas, Tex. An example of an image/video processor is OMAP3525 available from Texas Instruments Inc. of Dallas, Tex. One or more processors 224 may be present. Processor 224 may be an independent component, it may also be embedded in another component, such as in image sensor 222, or any combination thereof.

Memory 226 may include random access memory (RAM) and may also include nonvolatile memory, such as read only memory (ROM) and/or flash memory. Memory 226 may be an independent memory component, or may be embedded in another component, such as processor 224 and/or image sensor 222, or may be a combination of two, or may include a plurality of memory components. Memory 226 may include a detachable memory module such as a flash memory card. Memory 226 is adapted to include software modules (a module is a set of instructions). In particular, memory 226 can include one or more resources (e.g., a source code, a memory, a storage space, and the like) containing modules 226.1 to 226.3.

Tracking pattern module 226.1 is configured to receive an input including a tracking pattern embedded within image content and identify the embedded tracking pattern. In an example operation, tracking pattern module 226.1 may retrieve a tracking pattern from memory or from an external source. Then, tracking pattern module 226.1 may receive an input that includes one or more frames (e.g., one or more of frames 213.1 to 213.3) embedded within image content. Tracking pattern module 226.1 compares the tracking pattern to the one or more frames 213.1 to 213.3 to determine whether they include the tracking pattern. If the tracking pattern is identified within the image content 211 then augmented content can be rendered and displayed by device 220, as further described below.

In some embodiments, the tracking pattern can be hard-coded, pre-downloaded or streamed to the device to enable the tracking pattern module 226.1 to be capable of comparing images captured by image sensor 222 to the tracking pattern. In a preferred embodiment, the tracking pattern can be stored in memory 226 for optimal read access by tracking pattern module 226.1. In other embodiments, the tracking pattern can be retrieved from an external source, such as an external server. In additional embodiments, the tracking pattern can be retrieved from an external source and stored temporarily in memory 226. For example, a tracking pattern associated with a specific venue can be retrieved from an external server and stored in memory 226 when a user of device 220 visits the specific venue.

In some embodiments, tracking pattern module 226.1 identifies a finite number of features of the tracking pattern and searches the one or more frames 213.1 to 213.3 for those finite features. In some embodiments, tracking pattern module 226.1 identifies three or more features of the tracking pattern and attempts to detect the three or more features within the one or more frames 213.1 to 213.3. In other embodiments, tracking pattern module 226.1 identifies six or more features of the tracking pattern and queried within the one or more frames 213.1 to 213.3. In other embodiments, fifty four tracking pattern features are identified and queried by tracking pattern module 226.1.

In some embodiments, the number of tracking pattern features to be queried by tracking pattern module 226.1 can be based on a likelihood of perceiving individual features by device 220 at a given distance from display 110. For example, characteristics of a specific venue may be a factor in how many tracking pattern features are queried by tracking pattern module 226.1. In a non-limiting example, the number of tracking pattern features may be based on dimensions of a given venue (e.g., surface area). An average distance between any display 110 to any device 220 operated by a user within the venue can be calculated.

In some embodiments, an optimized number of queried features can be predetermined based on this calculation (e.g., in a predetermined tracking pattern 226.0). Then, tracking pattern module 226.1 can include instructions to query this predetermined number of tracking pattern features of predetermined tracking pattern 226.0.

In some embodiments, tracking pattern module 226.1 can be configured, upon detecting a tracking pattern within one or more frames 213.1 to 213.3, to transmit an instruction or other indicator (e.g., a flag) for enabling device 220 to omit the one or more frames 213.1 to 213.3 from a display presented on device 220. For example, upon detecting a tracking pattern within one or more frames 213.1 to 213.3, tracking pattern module 226.1 may cause device 220 to display or maintain a previous frame instead of the one or more frames that include the detected tracking pattern.

Pose extractor module 226.2 can be configured to identify a position and orientation of device 220 relative to display 110. In some embodiments, pose extractor module 226.2 can be configured to receive an input including the tracking pattern and one or more frames, such as frames 213.1 to 213.3. In some embodiments, pose extractor module 226.2 can be configured to identify within frames 213.1 to 213.3 a number of tracking pattern features having a predetermined minimum tracking pattern matching score. For example, pose extractor module may match a point (e.g., an area of pixels) of frame 213.3 to a potential tracking pattern feature and search previous frames 213.1 to 213.3 for the same potential tracking pattern feature. If, based on the previous frames 213.1 to 213.3, the comparison is below some minimal threshold, then the point can be discarded as not including the potential tracking pattern feature.

In some embodiments, when the number of points within one or more frames 213.1 to 213.3 are successfully matched to a number of tracking pattern features (e.g., a tracking pattern stored in memory 226), the pose extractor module processes the matched features to determine the relative distances and patterns between them. The processed features are compared to the tracking pattern to determine a position and coordinate of device 220 relative to display 110.

In a non-limiting example, if a tracking pattern includes an asymmetric pattern, such as a constellation feature, pose extractor module 226.2 queries frames 213.1 to 213.3 for features of the constellation. In some embodiments, a constellation feature can be provided to facilitate processing of the relative pattern. A constellation feature may include one or more geometric shapes. For example, a perfectly uniform tracking pattern may increase the number of potential pose solutions, complicating processing of the tracking pattern. In some embodiments, the constellation feature can be formed or provided to reduce the number of possible solutions to an optimal number of potential solutions per pose, ideally only one. When the constellation feature is identified within frames 213.1 to 213.3, pose extractor module 226.2 can perform an operation to relate this constellation feature back to the content. Then, pose extractor module 226.2 can determine from the tracking pattern any additional features that are expected proximate to the constellation feature. After additional features within the tracking pattern are identified, frames 213.1 to 213.3 can be queried with increased precision to determine a match to the tracking pattern. After a sufficient number of features, such as constellation features, are detected within frames 213.1 to 213.3, pose extractor module can be configured to output one or more of an orientation, a position or both, relative to display 110.

Augmented display module 226.3 can be configured to output image content associated with a tracking pattern matched to one or more frames 213.1 to 213.3, by tracking pattern module 226.2 and pose extractor module 226.1. In some embodiments, an element (e.g., a graphical element) associated with a tracking pattern matched by tracking pattern module 226.2 can be retrieved and displayed by device 220 based on a position, orientation or both identified by pose extractor module 226.1.

For example, upon detection of a tracking pattern augmented display module 226.3 retrieves a graphical element associated with the matched tracking pattern stored in memory 226 (e.g., from a database). Augmented display module 226.3 generates image content combining image content 212 (e.g., one or more frames 212.1 to 212.3) and the associated graphical element. The graphical element can be superimposed with image content 212 in a display output by device 220. Based on a position and orientation identified by pose extractor module 226.2, the graphical element can be overlaid having a matched position and orientation.

Figure 2B:
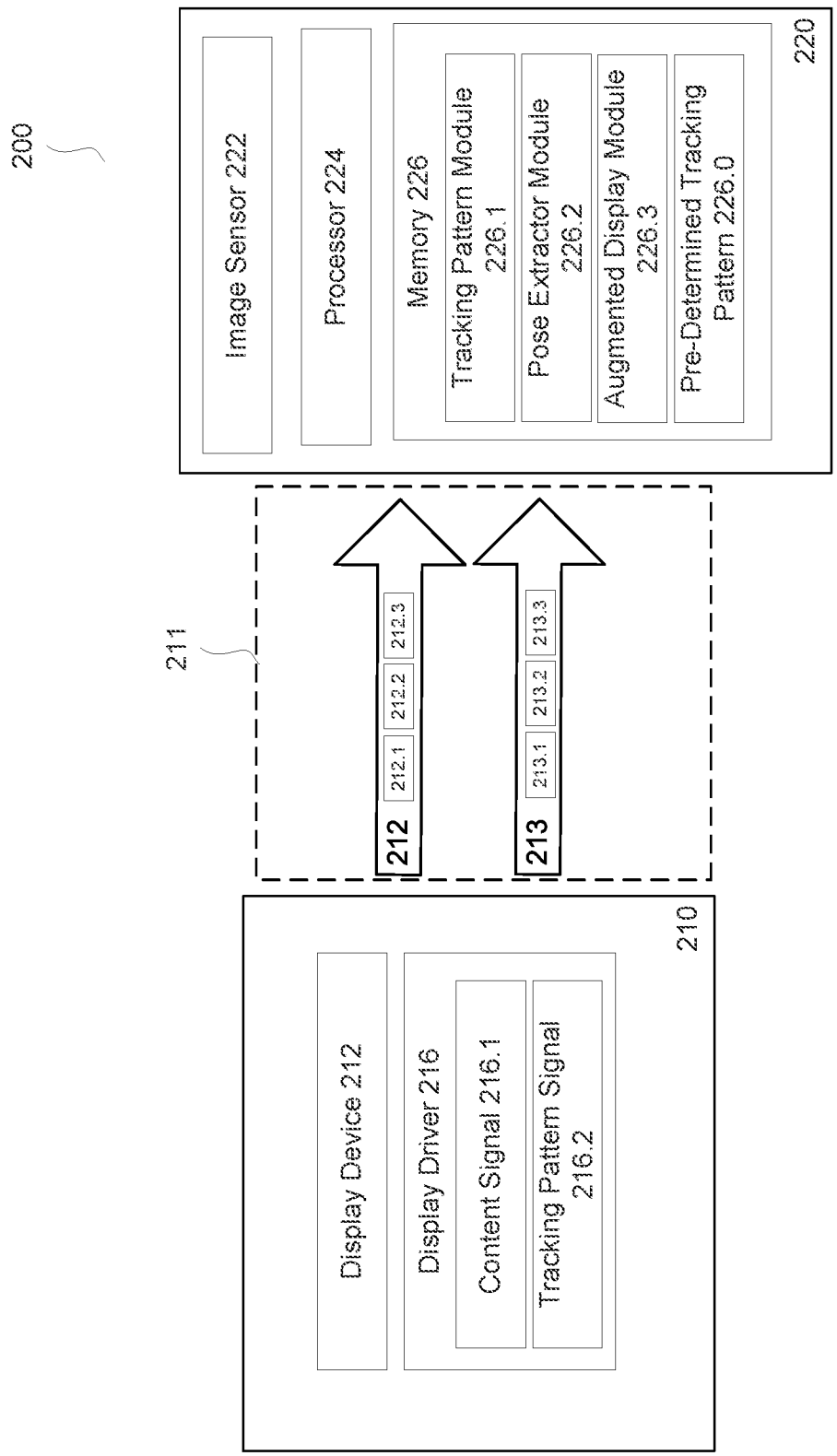

FIG. 2B illustrates a modulated display AR tracking system according to some embodiments. Elements in FIG. 2B with the same annotations as elements in FIG. 1 or 2A are described above. Referring to FIG. 2B, modulated display AR tracking system 200 includes display 210 and device 220 to provide image content to a user that can include image content based on an embedded tracking code.

Display 210 includes display device 212 and display driver 216. Display device 212 can be an LCD, LED, OLED, projector, electronic paper display, or the like. Display driver 216 can be any display driving device or system (e.g., a passive matrix, active matrix, or any other type) suitable for providing a signal to a display. In some embodiments, display device 212 can be configured to display a signal provided by display driver 216 at a frame rate of 60 frames per second or higher, preferably 120 frames per second or higher, or 240 frames per second or higher.

Display driver 216 is configured to output image signal to display device 212. In some embodiments, display driver 216 is configured to combine two or more image signals for output to display device 212. For example, display driver 216 can combine a content signal 216.1 and a tracking pattern signal 216.2 into a single image or video feed to be displayed on display device 212. For example, display driver 216 can be configured to provide an image signal to display device 212 by embedding a tracking pattern signal 216.2 within content signal 216.1.

In some embodiments, tracking pattern signal 216.2 can be embedded at a different frame rate than content signal 216.1. In a non-limiting example, content signal 216.1 can be provided at 60 frames per second which, if not augmented, is suitable for human cognition. However, if tracking pattern signal 216.2 were embedded at the same frame rate, a combined signal may be undesirable. For example, tracking pattern signal 216.2 may be perceivable or otherwise introduce flicker or other unwanted effects. In some embodiments, display driver 216 can be configured to provide the content signal 216.1 at the native frame rate (e.g., 60 frames per second) with tracking pattern signal 216.2 embedded at a higher frame rate (e.g., 240 frames per second) that is not perceivable to the human eye.

Modulated AR Tracking Method

Figure 3:
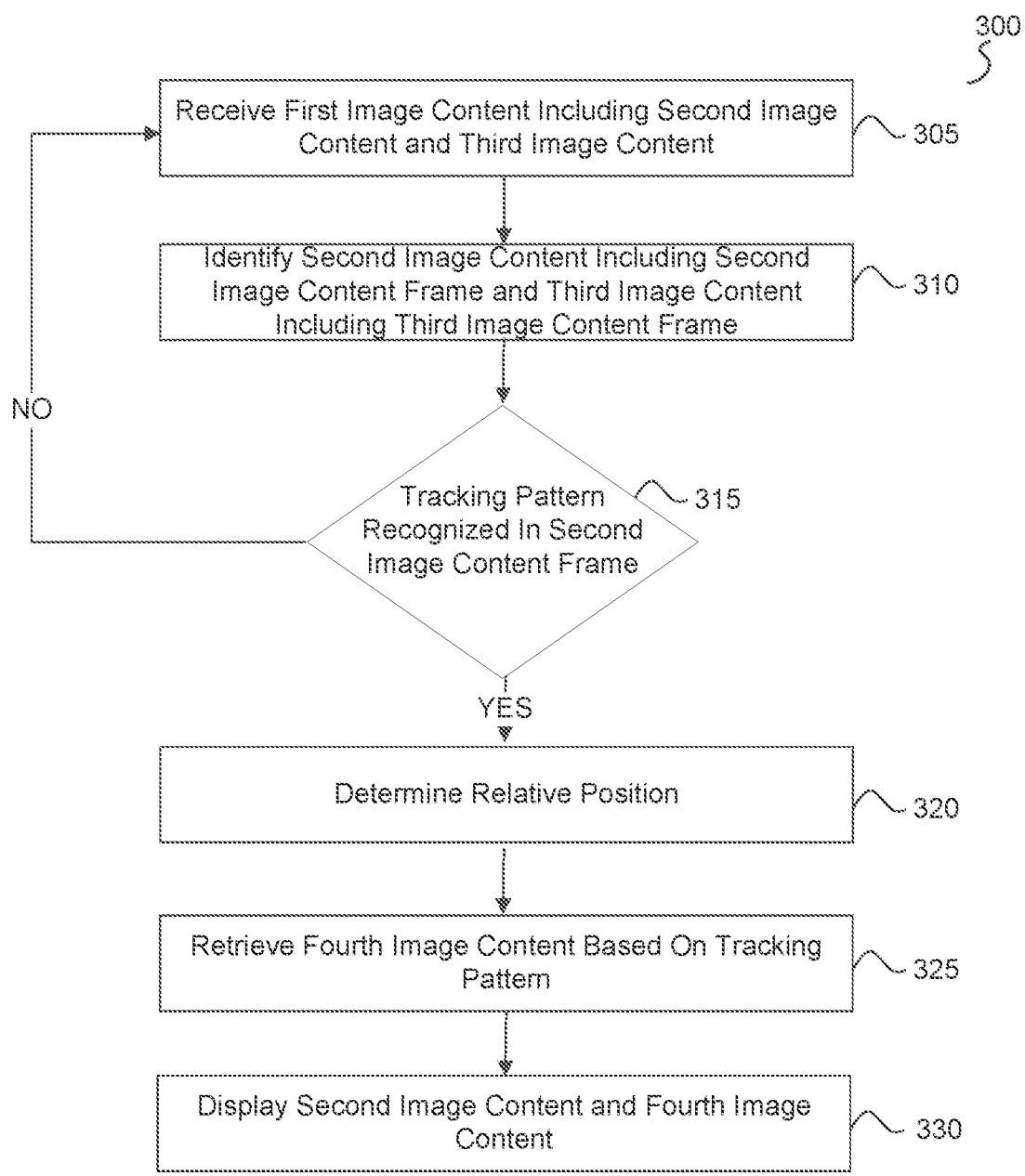
FIG. 3 is a flow diagram of a method for providing modulated display AR tracking. an illustration of a modulated display AR tracking system, according to some embodiments.

FIG. 3 illustrates an arrangement of a modulated AR tracking method for displaying augmented image content. Examples can incorporate any of the embodiments disclosed herein to include methods and systems for modulated AR tracking to provide augmented image content to a user based on an embedded tracking pattern.

Referring to FIG. 3, at operation 305, a device receives first image content emitted from a display. The first image content can include primary content, e.g., content intended to be perceptible to a user of the display, and third image content that includes one or more tracking patterns. Generally, the one or more tracking patterns are intended to be concealed from the user, for example, by embedding the third image content within the first image content at a frame rate not perceptible to the human eye, but sufficiently high to permit the device to recognize the third image content within the first image content. First image content can be captured at a frame rate sufficiently high to allow a low ratio of the third image content within the first image content (to avoid perception of the third image content to the human eye), while permitting a device, such as a mobile device to capture the third image content. In some embodiments, operation 305 includes capturing first image content at a frame rate of 120 frames to 240 frames per second, or a frame rate higher than 240 frames per second.

At operation 310, based on the first image content, second image content including second image content frames (e.g., frames 212.1 to 212.3) can be identified and distinguished from third image content including third image content frames (e.g., frames 213.1 to 213.3). In one non-limiting example, at operation 310 a histogram of a plurality of frames of first image content (e.g., image content 211) can be performed to determine frames meeting a specified minimum contrast threshold. If the minimum contrast threshold is satisfied, the frame may be characterized as potentially including a tracking pattern. That is, the frame may be classified as a third image content frame. If the frame is determined not to satisfy the minimum contrast threshold, then the frame may be classified as a second image content frame.

Alternatively, in some embodiments, operation 310 may be combined with a tracking pattern recognition operation described below in operation 315. In other embodiments, operation 310 can be omitted.

At operation 315, the device queries the third image content (or first image content if operation 310 is omitted) for a tracking pattern within second image content frames. The tracking pattern to form the query may be selected from one or more predetermined tracking patterns. For example, the tracking pattern may be retrieved from memory or from an external source, such as an external server. In some embodiments, the tracking pattern can be retrieved from an external source and stored temporarily in a memory of the device (e.g., memory 226).

Then, based on one or more frames (e.g., frames 213.1 to 213.3) of image data embedded within the first image content, a tracking pattern matching the retrieved tracking pattern can be identified. At operation 315, the tracking pattern can be compared to the one or more frames 213.1 to 213.3 to determine whether they include the tracking pattern. In some embodiments, the match can be based on identification of a finite number of tracking pattern features at points within one or more frames 213.1 to 213.3. The number of features may be predetermined based on characteristics of a given venue, as described above. For example, at operation 315, three features of a retrieved tracking pattern may be detected within the one or more frames 213.1 to 213.3. In other embodiments, six or more features of the retrieved tracking pattern may be queried for frames 213.1 to 213.3. In some embodiments, a minimum of fifty-four tracking pattern features can be provided in a given tracking pattern. These characteristics are provided as non-limiting examples and this disclosure is not limited to these exemplary characteristics. Based on the predetermined number of features to be matched, a query instruction can be formed to identify tracking pattern features within the one or more frames 213.1 to 213.3.

At operation 320, a relative position of the device can be computed based on characteristics of the matched tracking pattern. Operation 320 can include algorithms to identify a position and orientation of device (e.g., 220) relative to the display. For example, one or more features of a tracking pattern can be compared to one or more second content frames 213.1 to 213.3 to satisfy a predetermined minimum tracking pattern matching score. In a non-limiting example, operation 320 includes matching one or more points of a frame (e.g., frame 213.3) to a potential tracking pattern feature of the retrieved tracking pattern and searching previous frames 213.1 to 213.2 for the same potential tracking pattern feature. Operation 320 includes determining whether, based on the previous frames 213.1 to 213.2, the comparison is below a required threshold and, if so, the one or more points can be discarded or otherwise characterized as not including the potential tracking pattern feature.

If a number of points within one or more frames 213.1 to 213.3 are successfully matched to a number of tracking pattern features, an algorithm compares the relative distances and patterns of the matched features to those of the retrieved tracking pattern. Based on this comparison, a position and coordinate of device 220 relative to display 110 are computed. For example, if a tracking pattern feature of a first constellation feature is identified within one or more frames 213.1 to 213.3, a process can be performed to relate the first constellation feature back to the retrieved tracking pattern. After additional features, such as a second constellation feature and a third constellation feature, within the retrieved tracking pattern are identified frames 213.1 to 213.3 are queried for a match of these additional features. After a sufficient number of features, such as first to third constellation features, are detected within frames 213.1 to 213.3 the orientation and position of the device relative to the display can be computed.

At operation 325, fourth image content is associated with the matched tracking pattern. In some embodiments, operation 325 includes processes of retrieving fourth image content associated with the matched tracking pattern and rendering fourth image content, including changing a position and orientation of the image content. In some embodiments, fourth image content can be retrieved as part of a separate process or algorithm, and the process is omitted in operation 325. In that case, operation 325 can include a process or rendering fourth image content. In some embodiments, the fourth image content includes image content to be superimposed in a display at the point or points where the matched tracking pattern is identified. For example, a tracking pattern may be associated with an element such as a graphical element (e.g., one or more characters, symbols, images, animations, video recordings, or the like). Upon detection of a tracking pattern in operation 315 above, operation 325 retrieves a graphical element associated with the matched tracking pattern stored in memory 226 (e.g., from a database).

At operation 330, the fourth image content can be rendered and output by the device. For example, the fourth image content can be superimposed with second image content and output on a display of the device. As described above, the third image content having an embedded tracking pattern can be excluded from the display. In some embodiments, an element (e.g., a graphical element) associated with a matched tracking pattern can be retrieved and displayed by the mobile device based on a position, orientation or both identified at operation 320.

In some embodiments, the fourth image content includes the element associated with the matched tracking pattern, is combined with the second image content (e.g., one or more frames 212.1 to 212.3). The graphical element can be superimposed with image content 212 in a display output by device 220. The graphical element can be overlaid having a matched position and orientation based on a position and orientation identified by pose extractor module in operation 320.

In some embodiments, additional operations can be performed separately or within one of operations 305 to 330. For example, an additional operation can be performed to minimize jitter in the output of augmented display rendered in operation 330.

Examples

Exemplary Modulated AR Tracking Systems and Methods Implemented in a Venue

Figure 4:
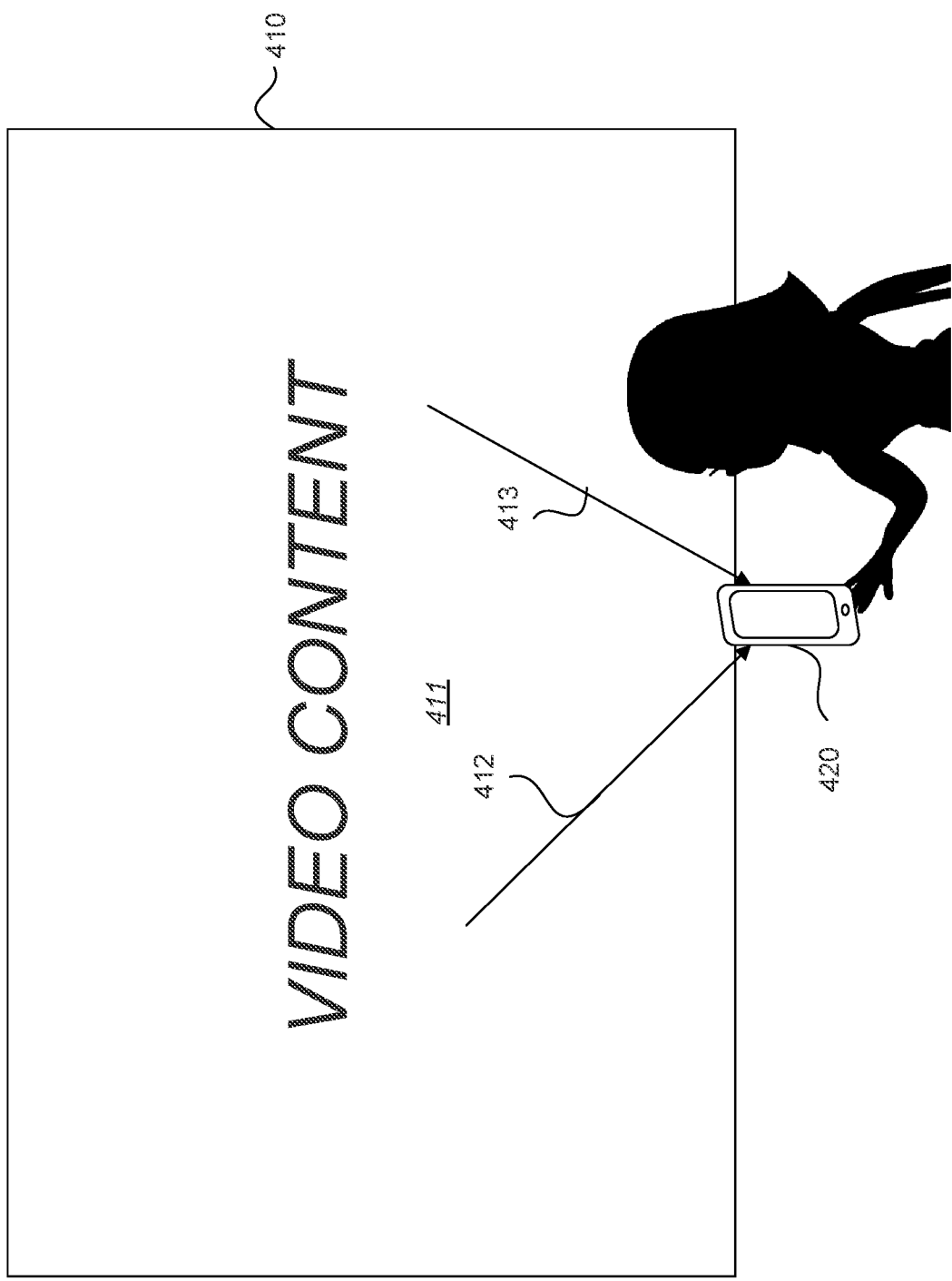
FIG. 4 is an illustration of a modulated display AR tracking system, according to some embodiments.

FIGS. 4 to 8 illustrate example applications of modulated display AR tracking systems and methods. Referring to FIG. 4, a user operates a device, such as a mobile device 420

(which may be an embodiment of device 120 or 220) in relation to a display 410 (which can be an embodiment of display 110).

Display 410 may be an LCD, an LED display, an OLED display, a projector-based display, or any other display device configured to output image content 411. Image content 411 is emitted from display 410 to mobile device 420, the image content 411 including first image content frames 412 and second image content frames 413. As described above, mobile device 420 can be configured to identify a tracking pattern (e.g., a predetermined tracking pattern) within second image content frames 413. The tracking pattern can be from one or more tracking patterns stored in a memory of mobile device 420, retrieved from an external source, or both.

Based on the matched tracking pattern and characteristics of the second image content frames, a relative position and orientation of the mobile device can be determined. For example, a matched tracking pattern can be associated with a specific display within a plurality of displays arranged in a venue. Mobile device 420 is configured to perform an algorithm that computes the position and orientation based on the matched tracking pattern and the relative spacing and orientation of the identified tracking pattern within second image content frames 413. More specifically, if a computed spacing of identified tracking pattern features is high relative to a reference value of the retrieved tracking pattern, the mobile device may be determined to be positioned near display 410 at a certain distance. If, alternatively, the computed spacing is low relative to the reference value, the mobile device may be determined to be positioned far from display 410. If the computed spacing of certain tracking pattern features are low and the computed spacing of other tracking pattern features are high, then the mobile device may be determined to be positioned laterally with respect to display 410.

Mobile device 420 then performs a function to output augmented content, i.e., a graphical element, based on the first image content frames 412 and image content associated with the retrieved tracking pattern. In some embodiments, the graphical element is displayed relative to the first image content based on a tracking location where the tracking pattern was detected. In some embodiments, the orientation of the graphical element is based on the computed orientation of the mobile device relative to display 410.

Figure 5:
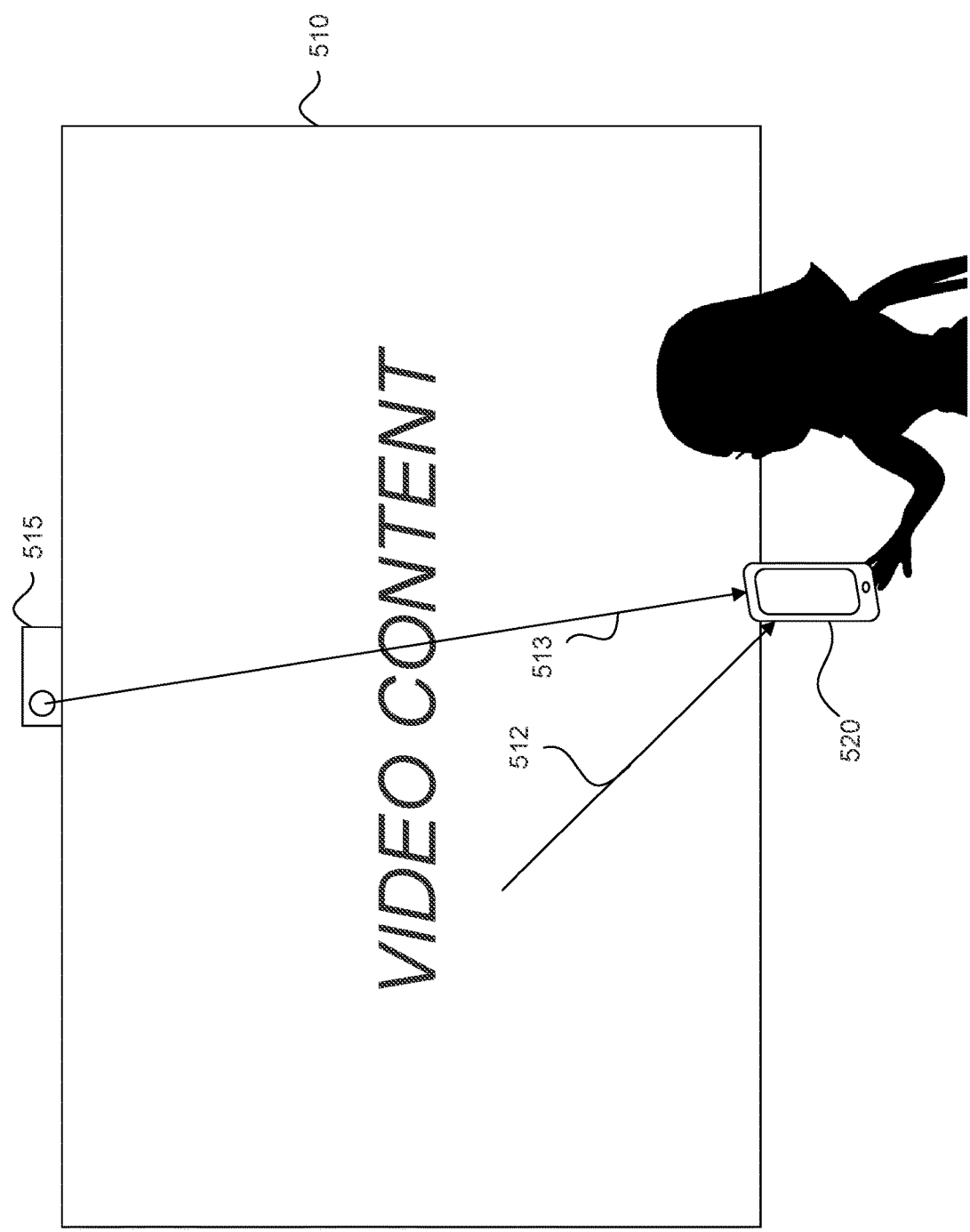
FIG. 5 is an illustration of a modulated display AR tracking system, according to some embodiments.

In some embodiments, a display may include one or more transmission devices. While display 410 is illustrated emit image content 411 that includes first image content frames 412 and second image content frames 413, the invention is not limited to this arrangement. FIG. 5 illustrates an arrangement where a display 510 (which may be an embodiment of display 110, 210, or 410 above) is coupled to a device 515. For example, device 515 may be an infrared (IR) transmitter. In some embodiments, mobile device 520 (which may be an embodiment of device 120 or 220 above) can be configured to receive image content 512 from display 510 and IR signal 513 from device 515. Based on a pattern included in IR signal 513, mobile device 520 performs a function to provide augmented video, as described above.

Figure 6A:
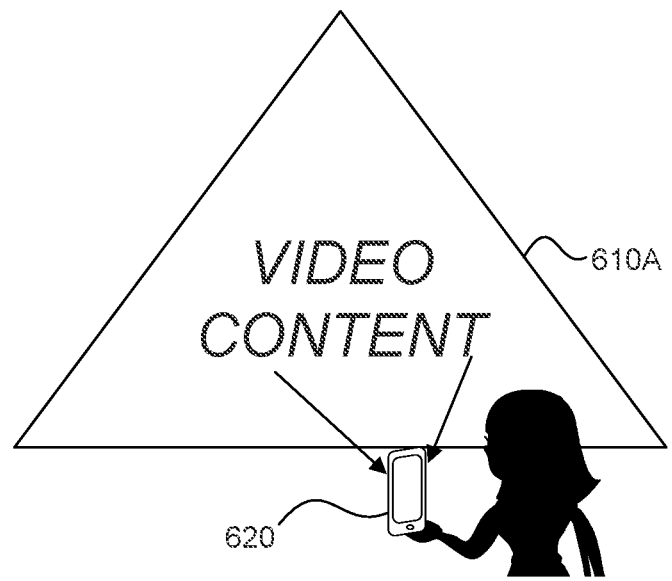
FIGS. 6A and 6B are illustrations of a modulated display AR tracking system including displays having geometric characteristics, according to some embodiments.
Figure 6B:
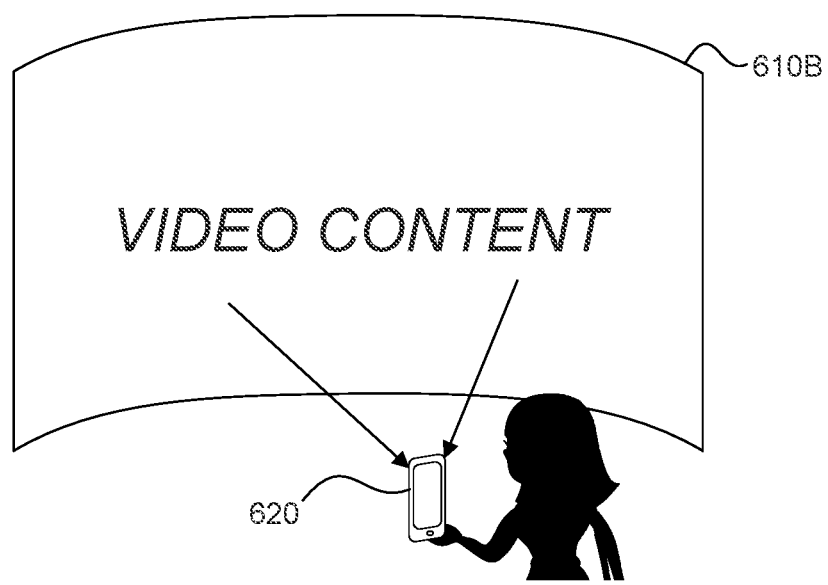

FIGS. 6A and 6B each illustrate embodiments of modulated display AR tracking systems including displays having characteristics, such as a geometric shape, analyzed in operations performed by a device of the system.

Referring to FIG. 6A, the position and orientation of a mobile device relative to the image content can be based on a characteristic (e.g., a shape) of the image content retrieved from the display. In FIG. 6A, image content of display 610A (which may be an embodiment of display 110, 210, 410, or 510 above) is emitted in a triangular geometric form. In capturing and processing the image content, mobile device 620 can determine, for example, what display from a plurality of displays, is being captured. In FIG. 6B, image content of display 610B (which may be an embodiment of display 110, 210, 410, or 510 above) is emitted in a rectangular geometric form having curvature.

In capturing and processing the image content, mobile device 620 can determine, for example, which display from a plurality of displays (e.g., display 610A or 610B), is being captured. Also, based on distortions in tracking pattern features identified from the captured image content relative to tracking pattern features expected from a retrieved tracking pattern, a relative position and orientation of the mobile device 620 to the given display (e.g., display 610A or 610B) can be determined.

Figure 7:
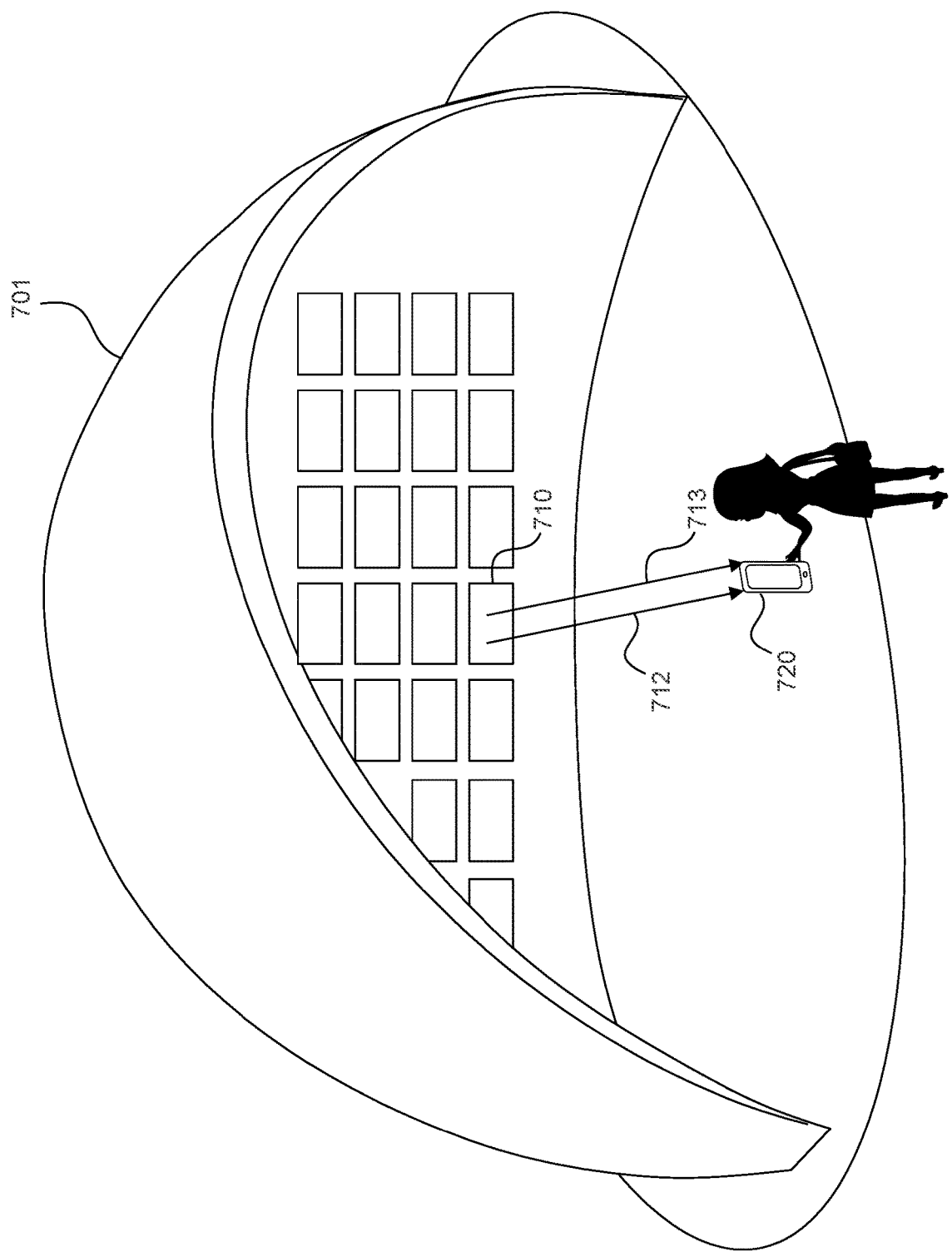
FIGS. 7 and 8 are illustrations of a modulated display AR tracking system implemented in a venue, according to some embodiments.

In a non-limiting example, FIG. 7 illustrates a modulated display AR tracking system implemented in a venue. Referring to FIG. 7, a domed (e.g., spherical or hemispherical) venue 701 includes a plurality of displays 710 (which may be an embodiment of display 110, 210, 410, 510, or 610 above). In some embodiments, a tracking pattern can be provided an external device, such as an IR transmitter (which can be an embodiment of device 515 described above). In other embodiments, a tracking pattern can be simultaneously provided by all displays 710. For example, displays 710 can be frame-locked with respect to the tracking pattern, where many simultaneous displays are captured in the video feed.

A user operating a mobile device 720 (which can be an embodiment of mobile device 120, 220, 420, 520, or 620) is enabled to view augmented image content based on first image content 712, which can be arbitrary video content, and second image content 713, which can be image content including one or more tracking patterns. Mobile device 720 is configured to relate content captured by an image sensor disposed in the mobile device (e.g., image sensor 222) to content associated with the captured content. In the context of a hemispherical venue, such as venue 701, the mobile device can be configured to expect patterns emitted from display 710 to be distorted in certain ways as a result of the venue curvature. The expected distortion provides cues enabling tracking patterns to be identified with a higher degree of accuracy than in a venue having no content distortions.

By implementing pose extraction with a high degree of accuracy, data based on a three dimensional model of venue 701 can be processed to identify an exact or substantially exact position of the mobile device 720 within the venue 701. Based on this position and orientation, augmented display can be provided on mobile device 720 to a user. For example, if venue 701 is Radio City Music Hall in New York, N.Y., image content including a graphical element can be retrieved and overlaid on an augmented display to include, for example, a virtual Rockette greeting the mobile device user. Alternatively, a graphical element may include a graphical object that the mobile device user can touch or input to and open a hyperlink to retrieve additional information about Radio City Music Hall.

Figure 8:
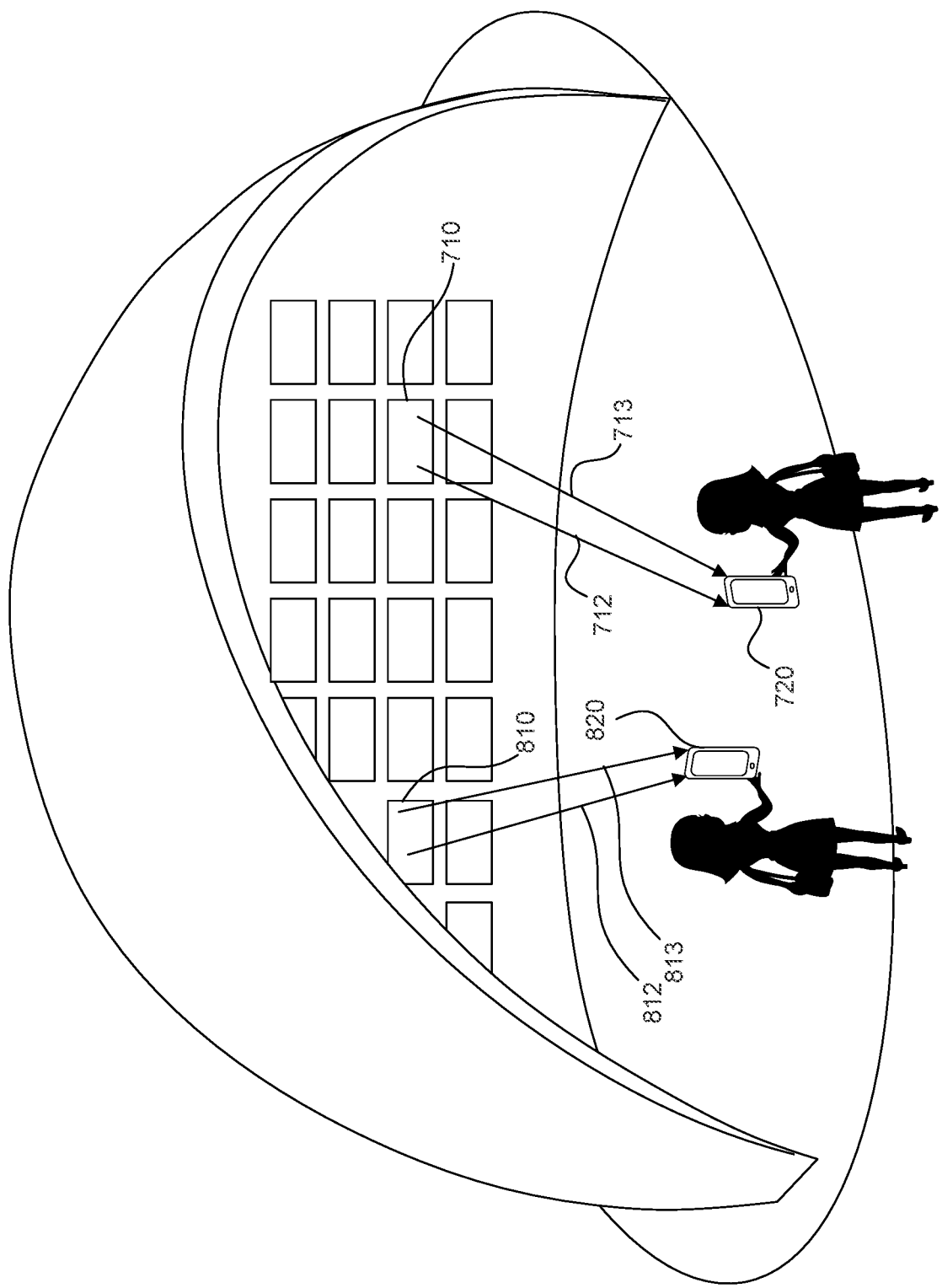

In another example, FIG. 8 illustrates an embodiment of FIG. 7 with two unique mobile device users. Referring to FIG. 8, two unique users may operate mobile devices 720 and 820 (which can be an embodiment of mobile device 120, 220, 420, 520, or 620), respectively. Mobile device 720 can be configured and oriented, as described above, to receive video content from displays 710 and 810. The user operating mobile device 720 is enabled to view augmented image content based on the image content emitted by display 710, based on a computed position and orientation enhanced based on image content distortions expected within the (hemispherical) venue 701. Mobile device 840 can be configured and oriented similarly, but to receive video content from displays 710 and 810 (which may be an embodiment of display 110, 210, 410, 510, or 610 above). The augmented display rendered on mobile device 820 can be distinct from that rendered on mobile device 720, based on different tracking patterns emitted by displays 710 and 810, respectively, and based on the computed position and orientation of the mobile devices relative to the respective displays. In some embodiments, the mobile devices 720 and 840 can track a combined, frame-locked signal over the whole surface of displays 710 and 810.

Furthermore, each mobile device (e.g., mobile devices 720 and 820) can be associated with a virtual avatar appearing, for example, in real time. Specifically, mobile device 720 can be configured to associate a graphical element to a user of mobile device 820, and vice versa. More specifically, a modulated display AR tracking system can be implemented to provide second image content (e.g., 713 and 813) that includes a tracking code associated with the mobile devices. For example, mobile device 720 is configured to receive second video content 713 that can include a tracking pattern associated with mobile device 820. Then, based on the system and methods described above, a graphical element representative of mobile device 820 and a user of the mobile device can be superimposed on image content displayed by mobile device 720. Likewise, mobile device 820 is configured to receive second video content 813 that can include a tracking pattern associated with mobile device 720 and display the graphical element superimposed on image content displayed by mobile device 820. In a non-limiting example, an augmented display of each mobile device 720 and 820 may include a virtual spaceship having each user's avatar and an interactive game where each user is enabled to perform operate the mobile device to shoot at an asteroid or other virtual object.

A system includes a display and a device configured to transmit first image content, the image content including a first image content frame and a second image content frame. The device includes an image sensor, a processor and a memory. The device is configured to identify the first image content frame and the second image content frame by distinguishing at least one feature of the first image content frame, recognize at least one tracking pattern embedded of the second image content frame, retrieve a graphical element based on the at least one tracking pattern of the second image content frame; and display augmented image content including the first image content frame and the graphical element. In some embodiments, the at least one tracking pattern includes one or more geometric shapes. In some embodiments, the augmented image content does not include the second image content frame. The device is configured to recognize at least one predetermined tracking pattern in the second image content frame. In some embodiments, the device is configured to recognize the at least one predetermined tracking pattern by reading the predetermined tracking pattern from the memory and comparing the predetermined tracking pattern to the second image content frame to determine if the second image content frame includes the predetermined tracking pattern. In some embodiments, the display is configured to transmit the second image content frame within the image content at a frame rate not perceptible to the human eye. In some embodiments, the display is configured to transmit the second image content frame within the image content at or greater than a frame rate of 240 frames per second. The memory includes a pose extractor module having a function to determine from the second video frame a position of the device relative to the first display device.

A method includes receiving, by a user device, first image content from a video display, the first image content including first image content frames, wherein the first image content frames include one or more second image content frames and one or more third image content frames. The method further includes identifying, by the user device and based on the first image content frames, second image content including the second content video frames and third image content including the third image content frames. The method also includes inputting, by the user device, the first image content frames to a pose extractor module of the user device. Additionally, the method includes recognizing, by the pose extractor module of the user device, at least one tracking pattern embedded in the second image content frames. The method includes retrieving, by the user device, fourth image content based on the at least one tracking pattern in the second image content frames. The method also includes displaying, by the user device, the second image content and the fourth image content. In some embodiments, the third image content is not displayed by the user device. The recognizing the at least one tracking pattern in the second image content frames can include recognizing at least one predetermined tracking pattern in the second image content frames. The recognizing the at least one predetermined tracking pattern in the second image content frames can include retrieving a predetermined tracking pattern from a memory; and comparing the predetermined tracking pattern to one or more frames of the second image content frames to determine if the second image content frames includes the predetermined tracking pattern. The first image content frame can include the second image content frames that are transmitted by the video display at frame rate not perceptible to the human eye. In some embodiments, the second image content frames are transmitted by the video display at or above 60 to 120 frames per second. In other embodiments, the second image content frames are transmitted by the video display at or above 60 to 240 frames per second. In other embodiments, the second image content frames are transmitted by the video display at or above 240 frames per second.

A mobile device includes an image sensor, a processor; and at least one memory operable to store a plurality of instructions that, when executed by the processor performs operations. The operations include receiving first image content, the first video including first image content frames, identifying second image content based on the first image content frames including second content video frames and third image content including third image content frames, recognizing at least one tracking pattern embedded in the second image content frames, retrieving fourth image content based on the at least one tracking pattern in the second image content frames, and displaying the second image content and the fourth image content. In some embodiments, the third image content is not displayed by the user device. The recognizing the at least one tracking pattern in the second image content frames can include recognizing at least one predetermined tracking pattern in the second image content frames. In some embodiments, the recognizing the at least one predetermined tracking pattern in the second image content frames includes retrieving a predetermined tracking pattern from a memory; and comparing the predetermined tracking pattern to one or more frames of the second image content frames to determine if the second image content frames includes the predetermined tracking pattern. In some embodiments, the mobile device is configured to receive the first image content at a frame rate at or above 240 frames per second. In some embodiments, the fourth image content includes one or more graphical objects, and the displaying the second image content and the fourth image content includes displaying the one or more graphical objects superimposed on the second image content.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A mobile device, comprising:
   an image sensor configured to capture first image content as the first image content is being displayed by a display device, the first image content including a first image content frame being displayed at a first frame rate that is not perceivable to a human eye; and
   a processor configured to:
      identify a first plurality of points of a tracking pattern feature of a tracking pattern and a second plurality of points within the first image content frame that match the first plurality of points of the tracking pattern feature,
      determine a first plurality of relative distances between the first plurality of points and a second plurality of relative distances between the second plurality of points,
      compute a relative position or a relative orientation of the mobile device in relation to the display device based upon a comparison between the first plurality of relative distances and the second plurality of relative distances,
      render a graphical element associated with the tracking pattern onto the first image content based on the relative position or the relative orientation to provide second image content; and
   a display output configured to display the second image content.

2. The mobile device of claim 1, wherein the first image content further comprises a second image content frame being displayed at a second frame rate that is perceivable to the human eye.

3. The mobile device of claim 1, wherein the processor is further configured to identify that the first image content frame includes the tracking pattern feature to determine that the first image content frame includes the tracking pattern.

4. The mobile device of claim 3, wherein the processor is configured to identify the first image content frame in response to a first predetermined number of points of the first image content frame matching a second predetermined number of points of the tracking pattern feature.

5. The mobile device of claim 1, wherein the processor is further configured to:
   determine a first configuration and arrangement of the first plurality of points and a second configuration and arrangement of the first plurality of points, and
   compute the relative position or the relative orientation of the mobile device in relation to the display device based upon a comparison between the first configuration and arrangement and the second configuration and arrangement.

6. The mobile device of claim 1, wherein the processor is configured to compute the relative position in relation to the display device based upon differences between the first plurality of relative distances and corresponding relative distances from among the second plurality of relative distances.

7. The mobile device of claim 1, wherein the processor is configured to change a position and orientation of the graphical element based on the relative position or the relative orientation while rendering the graphical element onto the first image content.

8. A method for rendering image content onto a display output of a mobile device, the method comprising:
   capturing, by the mobile device, a first image content as the first image content is being displayed by a display device, the first image content including a first image content frame being displayed at a first frame rate that is not perceivable to a human eye;
   identifying, by the mobile device, a first plurality of points of a tracking pattern feature of a tracking pattern and a second plurality of points within the first image content frame that match the first plurality of points of the tracking pattern feature;
   determining, by the mobile device, a first plurality of relative distances between the first plurality of points and a second plurality of relative distances between the second plurality of points;
   determining, by the mobile device, a first configuration and arrangement of the first plurality of points to a second configuration and arrangement of the second plurality of points;
   computing, by the mobile device, a relative position or a relative orientation of the mobile device in relation to the display device based upon a comparison between the first plurality of relative distances and the second plurality of relative distances and a comparison of the first configuration and arrangement and the second configuration and arrangement;

rendering, by the mobile device, a graphical element associated with the tracking pattern onto the first image content based on the relative position or the relative orientation to provide second image content; and displaying, by the display output of the mobile device, the second image content.

9. The method of claim 8, wherein the first image content further comprises a second image content frame being displayed at a second frame rate that is perceivable to the human eye.

10. The method of claim 8, further comprising identifying that the first image content frame includes the tracking pattern feature to determine that the first image content frame includes the tracking pattern.

11. The method of claim 10, wherein the identifying the first image content frame is in response to a first predetermined number of points of the first image content frame matching a second predetermined number of points of the tracking pattern feature.

12. The method of claim 8, wherein the computing comprises computing the relative position in relation to the display device based upon differences between the first plurality of relative distances and corresponding relative distances from among the second plurality of relative distances between the second plurality of points.

13. The method of claim 8, wherein the computing comprises computing the relative orientation in relation to the display device based upon differences between the first configuration and arrangement and the second configuration and arrangement.

14. A mobile device, comprising:
a memory configured to store a tracking pattern; and
a processor configured to execute instructions stored in the memory, the instructions, when executed by the processor, configuring the processor to:
identify a first plurality of points of a tracking pattern feature of the tracking pattern stored in the memory and a second plurality of points within a first image content frame that match the first plurality of points of the tracking pattern feature, the first image content frame being included within a first image content that is captured by the mobile device as the first image content is being displayed by a display device at a first frame rate that is not perceivable to a human eye;
determine a first configuration and arrangement of the first plurality of points and a second configuration and arrangement of the first plurality of points,
compute a relative position or a relative orientation of the mobile device in relation to the display device based upon a comparison between the first configuration and arrangement and the second configuration and arrangement,
render a graphical element associated with the tracking pattern onto the first image content based on the relative position or the relative orientation to provide second image content, and
provide the second image content to a display output for display.

15. The mobile device of claim 14, wherein the first image content further comprises a second image content frame being displayed at a second frame rate that is perceivable to the human eye.

16. The mobile device of claim 14, wherein the instructions, when executed by the processor, further configure the processor to identify that the first image content frame includes the tracking pattern feature to determine that the first image content frame includes the tracking pattern.

17. The mobile device of claim 16, wherein the instructions, when executed by the processor, configure the processor to identify the first image content frame in response to a first predetermined number of points of the first image content frame matching a second predetermined number of points of the tracking pattern feature.

18. The mobile device of claim 14, wherein the instructions, when executed by the processor, further configure the processor to:
determine a first plurality of relative distances between the first plurality of points to a second plurality of relative distances between the second plurality of points; and
compute the relative position or the relative orientation of the mobile device in relation to the display device based upon a comparison between the first plurality of relative distances and the second plurality of relative distances.

19. The mobile device of claim 14, wherein the instructions, when executed by the processor, configure the processor to compute the relative orientation in relation to the display device based upon differences between the first configuration and arrangement and the second configuration and arrangement.

20. The mobile device of claim 14, wherein the instructions, when executed by the processor, configure the processor to change a position and orientation of the graphical element based on the relative position or the relative orientation while rendering the graphical element onto the first image content.

* * * * *